United States Patent
Venier et al.

(10) Patent No.: US 12,071,355 B2
(45) Date of Patent: Aug. 27, 2024

(54) METHOD FOR PRODUCING ZIRCONIUM DIOXIDE NANOPARTICLES IN THE PRESENCE OF AN AMINO ACID

(71) Applicant: MATHYM, Champagne-Au-Mont-D'Or (FR)

(72) Inventors: Amandine Venier, Lyons (FR); Erik Camposilvan, Lyons (FR); Miguel Comesana-Hermo, Vigo (ES)

(73) Assignee: MATHYM, Champagne-Au-Mont-d'Or (FR)

( * ) Notice: Subject to any disclaimer, the term of this patent is extended or adjusted under 35 U.S.C. 154(b) by 696 days.

(21) Appl. No.: 17/293,208

(22) PCT Filed: Nov. 28, 2019

(86) PCT No.: PCT/EP2019/082930
§ 371 (c)(1),
(2) Date: May 12, 2021

(87) PCT Pub. No.: WO2020/109477
PCT Pub. Date: Jun. 4, 2020

(65) Prior Publication Data
US 2022/0009790 A1    Jan. 13, 2022

(30) Foreign Application Priority Data
Nov. 30, 2018  (FR) ...................... 1872183

(51) Int. Cl.
*C01G 25/02*    (2006.01)

(52) U.S. Cl.
CPC .......... *C01G 25/02* (2013.01); *C01P 2004/04* (2013.01); *C01P 2004/64* (2013.01); *C01P 2006/22* (2013.01)

(58) Field of Classification Search
CPC ...................................... C01G 25/02
See application file for complete search history.

(56) References Cited

U.S. PATENT DOCUMENTS

2005/0123465 A1    6/2005   Chane-Ching

FOREIGN PATENT DOCUMENTS

| EP | 2371768 B1 | 10/2014 |
| FR | 2899906 A1 | 10/2007 |

OTHER PUBLICATIONS

International Search Report (and English translation) and Written Opinion of the International Searching Authority for International Application No. PCT/EP2019/082930 mailed on Mar. 4, 2020.
(Continued)

*Primary Examiner* — James A Fiorito
(74) *Attorney, Agent, or Firm* — Heslin Rothenberg Farley & Mesiti P.C.

(57) ABSTRACT

This invention relates to a process for preparing nanoparticles of zirconium dioxide, $ZrO_2$, by hydrothermal treatment of a zirconium IV compound in the presence of water, at a pH below 7, and at least one amino acid comprising at least 4 carbon atoms, said amino acid exhibiting an acid function to amine function ratio greater than or equal to 1. The invention also relates to zirconium dioxide nanoparticles having a visible transmittance greater than or equal to 20% at 400 nm and greater than or equal to 95% at 800 nm measured in water at a concentration of 40% by weight.

13 Claims, 1 Drawing Sheet

(56) References Cited

OTHER PUBLICATIONS

Humlicek, Josef, "Data Analysis for Nanomaterials: Effective Medium Approximation, Its Limits and Implementations", Ellipsometry at the Nanoscale, Abstract only, First Online: Mar. 12, 2013, https://link.springer.com/chapter/10.1007/978-3-642-33956-1_3.
Lin, Yen-Ting, et al., "Enhanced reliability of LEDs encapsulated with surface-modified zirconia/silicone hybrids under thermal shock", Materials Chemistry and Physics, vol. 206, pp. 136-143 (2018).
Pereira, F.J., et al., "Effect of temperature on the crystallinity, size and fluorescent properties of zirconia-based nanoparticles", Materials Chemistry and Physics, vol. 152, pp. 135-146 (2015).

[Fig. 1]
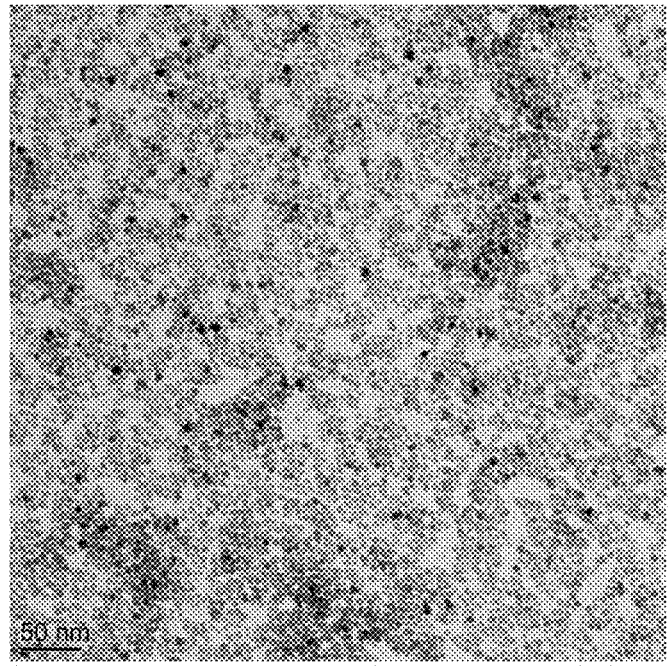
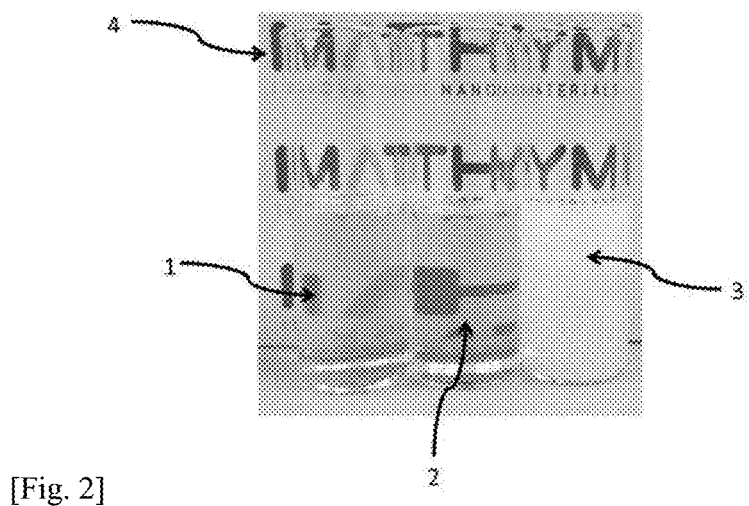
[Fig. 2]

METHOD FOR PRODUCING ZIRCONIUM DIOXIDE NANOPARTICLES IN THE PRESENCE OF AN AMINO ACID

CROSS REFERENCE TO RELATED APPLICATIONS

This application is a national stage filing under section 371 of International Application No. PCT/EP2019/082930 filed on Nov. 28, 2019, and published on Jun. 4, 2020 as WO 2020/109477, which claims priority to French Application No. 1872183, filed on Nov. 30, 2018. The entire contents of WO 2020/109477 are hereby incorporated herein by reference.

FIELD OF INVENTION

This invention relates to a process for preparing zirconium dioxide nanoparticles by hydrothermal treatment carried out in the presence of an amino acid. The invention also relates to the use of these nanoparticles, in particular in the form of dispersions.

PRIOR ART

There is currently a strong interest in zirconium dioxide (zirconia) nanoparticles in various industrial sectors. One of the techniques for preparing nanoparticles of zirconium dioxide, $ZrO_2$, consists in hydrothermally treating a zirconium compound, in particular a zirconium salt, in which the zirconium has an oxidation degree of 4. Thus, during the preparation of $ZrO_2$ particles by hydrothermal treatment, the zirconium is neither oxidized nor reduced, and its degree of oxidation is unchanged.

Zirconium dioxide may be in crystalline form and have three different crystal structures depending on the temperature, the presence of dopants and the size of the crystals: monoclinic, quadratic (tetragonal) and cubic. For particles of nanometric size, the quadratic and cubic phases are difficult to distinguish by the X-ray diffraction measurement method (XRD), in the description of the prior art and of the invention, they are labeled together under the name of "quadratic/cubic". The monoclinic phase is easily distinguished from the other two. It is possible to favor either of these crystal configurations by adjusting the preparation process.

Nevertheless, the preparation of stable dispersions of zirconium dioxide nanoparticles exhibiting improved properties in terms of crystallinity, colloidal stability, narrow polydispersity and transparency remains a real challenge. In fact, the methods available to date have for the most part a weak control of the size of the particles with a colloidal stability which may be greatly improved. In particular, these dispersions generally exhibit a high level of aggregation, which has a negative impact on the properties of the desired end product. The zirconium dioxide nanoparticles may in particular be used in the preparation of nanocomposite and ceramic materials.

In the case of ceramic materials and ceramic composites, the use of colloidal dispersions of zirconium dioxide, as an additive, as a main or secondary component may make it possible to obtain improved optical, thermal and mechanical properties, thanks to the possibility of better control of microstructure and porosity. The use of colloidal dispersions makes it possible to reduce the temperature of heat treatments compared with the processes not involving such dispersions, which makes it possible to obtain generally finer microstructures or crystals that are better dispersed in the composite.

Among the applications of these ceramics, mention may be made of dense or nanoporous coatings, the manufacture of high transmittance nanoceramics based on zirconia, the manufacture of nanocomposites based on zirconia/alumina, use as a sintering additive, preparation of ceramic inks for 2D and 3D printing.

In the case of nanocomposites, a dispersion of zirconium dioxide nanoparticles is generally mixed with a monomer, an oligomer, a polymer or a prepolymeric resin. A nanocomposite material containing large fractions of zirconia nanoparticles exhibits increased refractive index, abrasion resistance, elastic modulus and radiopacity, and reduced shrinkage relative to the matrix. At the same time, if the nanoparticles are not agglomerated in the matrix and have a sufficiently small size, the nanocomposite material may maintain high transmittance in the visible. The total transmittance (T) of a material corresponds to the ratio of the luminous flux transmitted through a fixed thickness of said material to the incident flux and may be expressed with a value between 0 and 1 or with the corresponding percentage (T %).

Among the applications of these composites, we may cite the dental field (composites, varnishes, adhesives), optics, electronics and energy (high refractive index, anti-reflective and anti-scratch coatings), lighting (high refractive index coatings for extracting light from devices, e.g., OLED and HB-LED) and cosmetics.

Moreover, in the context of these applications, it is preferable for the dispersion to have a highly visible transmittance, so as not to significantly alter the aesthetic appearance of the composite material obtained from a dispersion of nanoparticles.

Although stable dispersions are, to date, available, they are generally not very concentrated in nanoparticles mainly because of the technical difficulties associated with their preparation. Indeed, at high concentrations, the zirconium dioxide nanoparticles tend to agglomerate while the dispersions tend to gel. In addition, in general, the transmittance of dispersions of zirconium dioxide nanoparticles decreases as the concentration of zirconium dioxide nanoparticles increases.

Patent EP 2,371,768 B1 describes an aqueous dispersion of zirconium oxide exhibiting, for a concentration of 30% by weight, a transmittance of up to 44.3% at 400 nm and up to 98.2% at 800 nm and a viscosity of less than 20 mPa·s at 25° C.

The document US 2005/123465 describes a process for preparing a dispersion of $ZrO_2$ particles and their modification with caproic acid. This process consists of taking a colloidal dispersion of $ZrO_2$ colloids and mixing it with a solution containing aminocaproic acid. It is not a synthesis by hydrothermal treatment in the presence of an amino acid.

Document FR 2,899,906 describes the preparation of nanoparticles of metal oxides from zirconium tetraisopropoxide in the presence of acetylacetone, propanol and para-toluenesulfonic acid. Once the $ZrO_2$ particles have been obtained, they may be mixed with aminocaproic acid. This is not a hydrothermal treatment in the presence of an amino acid.

Lin et al. (Materials Chemistry and Physics, 206 (2018), pages 136-143) have described hybrid compounds based on zirconia and silicone for encapsulating LEDs. The film obtained from this hybrid compound exhibits a transmittance greater than 95% at a wavelength of between 400 and 800 nanometers.

Perreira et al. (Materials Chemistry and Physics, 152 (2015), pages 135-146) have described the synthesis of particles based on $ZrO_2$ by mixing a zirconium IV compound and an arsenic III type dopant and/or L-cysteine at basic pH in an alcohol at room temperature. It is not a hydrothermal treatment at an acidic pH.

In any event, having a dispersion concentrated in zirconium dioxide nanoparticles makes it possible to facilitate the handling of these nanoparticles insofar as the user does not have to handle a powdery product. Indeed, even if having a powder may prove to be advantageous for packaging and transport, a concentrated dispersion facilitates the handling of the nanoparticles, on the condition that it is stable.

On the other hand, the stability of a dispersion makes it possible to control the dosage of the nanoparticles, the latter being dispersed in a homogeneous manner. Finally, having a transparent dispersion of nanoparticles is particularly advantageous in certain fields, for example in the dental field.

Similarly, the methods for preparing this type of material, described in the literature, include experimental conditions (pressure, temperature or hydrothermal treatment time) which make their implementation on an industrial scale difficult. In view of all these limitations, the development of a technical process capable of producing substantial quantities of $ZrO_2$ nanoparticles with good colloidal dispersion, good transmittance and good crystallinity while keeping relatively mild synthetic conditions remains a subject to be explored. Thus, such a development would constitute, in itself, a very important advance in the industrialization of high-quality nanodispersions of zirconia, materials of particular interest for many technical sectors.

DISCLOSURE OF THE INVENTION

The Applicant has found, quite unexpectedly, that it was possible to soften the synthesis conditions and increase the concentration of the zirconium dioxide nanoparticles and the quality of the dispersion by preparing them by hydrothermal treatment in the presence of an amino acid.

More specifically, this invention relates to a process for preparing nanoparticles of zirconium dioxide, $ZrO_2$, by hydrothermal treatment of a zirconium IV compound in the presence of water, at a pH below 7, and at least one amino acid comprising at least 4 carbon atoms, said amino acid exhibiting an acid function to amine function ratio greater than or equal to 1.

The invention also relates to zirconium dioxide nanoparticles having a visible transmittance greater than or equal to 20% at 400 nm and greater than or equal to 95% at 800 nm measured in water at a concentration of 40% by weight.

The invention also relates to a dispersion of said nanoparticles of zirconium dioxide, $ZrO_2$. These nanoparticles may be stabilized by a conventional stabilizing agent or by at least one amino acid comprising at least 4 carbon atoms, said amino acid having an acid function/amine function ratio greater than or equal to 1. More precisely, the dispersion of nanoparticles of $ZrO_2$ may comprise up to 80% by weight of $ZrO_2$ nanoparticles, and have a transmittance, for a dispersion at 40% by weight, advantageously ranging from 20% up to 83% for 400 nm wavelength and advantageously ranging from 95% up to 99.9% for 800 nm wavelength.

Also said dispersion has a very low viscosity, advantageously greater than or equal to 1 mPa·s and less than or equal to 10 mPa·s at 40% by weight in water. In addition, the dispersion maintains high transmittance for higher concentrations. A 65% by weight dispersion has a transmittance ranging from 15%, advantageously from 45%, up to 75% for 400 nm wavelength and ranging from 85%, advantageously from 95%, up to 99% for 800 nm. Furthermore, said dispersion has a high refractive index, advantageously greater than or equal to 1.40 for a concentration of 40% by weight and greater than or equal to 1.50 for a concentration of 65% by weight.

In addition, the dispersion after purification with water has a very low level of organic matter, advantageously less than or equal to 15% by weight, more advantageously less than or equal to 8% by weight, even more advantageously less than or equal to 5% by weight, even more preferably less than or equal to 3.5% by weight.

Also, said dispersion has a very low index of dispersion advantageously between 1 and 7, more advantageously between 1 and 4, even more advantageously between 1 and 2, even more advantageously between 1 and 1.5.

The invention also relates to nanoparticles in powder form, having an amino acid stabilizing agent. In particular, the powder is obtained by drying the dispersion described above. Hereinafter, the term "particles" may also be used to designate the $ZrO_2$ nanoparticles.

Zirconium IV Compound

As indicated above, the process according to the invention makes it possible to obtain zirconium dioxide nanoparticles by hydrothermal treatment of a zirconium IV compound. Advantageously, the zirconium IV compound used in the process according to the invention is selected from the group consisting of zirconium halides. Preferably, the zirconium IV compound is zirconium oxychloride ($ZrOCl_2$).

In a preferred embodiment, the zirconium IV compound is in hydrated form such as zirconium oxychloride octahydrate ($ZrOCl_2 \cdot 8H_2O$). This embodiment is advantageous because the water molecules provided by the zirconium IV compound in hydrated form may be sufficient and it is then not necessary to add water to carry out the hydrothermal treatment.

In a particular embodiment, the water from the hydrothermal treatment is obtained only from a hydrated form of the zirconium IV compound.

It should be noted that the zirconium IV compound used in the process according to the invention is not zirconium dioxide.

Amino Acid

According to the invention, the amino acid comprises at least 4 carbon atoms, advantageously between 4 and 12 carbon atoms, more advantageously between 4 and 6 carbon atoms.

The amine function(s) of the amino acid may be primary, secondary or tertiary. However, the primary amine functions are preferred. The possible carbon atoms of the secondary and tertiary amine functions are counted in the number of carbon atoms of the amino acid.

The acid function(s) of the amino acid is a carboxylic acid function, $C(=O)OH$, whose carbon atom is counted in the number of carbon atoms of the amino acid.

The amino acid may be linear or branched. However, it is advantageously linear.

The amino acid not only has an influence on the conditions of the hydrothermal treatment (temperature, pressure) but also on the polydispersity and on the transmittance in the visible range of the dispersion of zirconium dioxide nanoparticles.

In accordance with the invention, the hydrothermal treatment is carried out in the presence of an amino acid having an acid function/amine function ratio greater than or equal to 1. This ratio is preferably on the order of 1.

Indeed, the Applicant has noticed that when the amino acid has more amine functions than acid functions, it was not possible to obtain a dispersion of stable zirconium dioxide nanoparticles. Thus, amino acids such as lysine do not make it possible to obtain a dispersion of zirconium dioxide nanoparticles which is stable under the conditions of this invention.

In a particular embodiment, the amino acid may comprise several acid functions and several amine functions.

In another particular embodiment, the amino acid may comprise several acid functions and a single amine function.

In a preferred embodiment, the amino acid comprises a single acid function and a single amine function.

In another particular embodiment, several amino acids may be used in the process.

Thus, the amino acid is preferably selected from the group consisting of aminobutanoic acids, aminopentanoic acids, aminohexanoic acids, aminoheptanoic acids, aminooctanoic acids, aminononanoic acids, aminodecanoic acids, aminoundecanoic acids and aminodecanoic acids, only or as a mixture, and more preferably in the group consisting of aminobutanoic acids, aminopentanoic acids and aminohexanoic acids and even more preferably in the group consisting of 4-aminobutanoic acid, also called 4-aminobutyric acid, 2-aminopentanoic acid, also called norvaline, 5-aminopentanoic acid, also called 5-aminovaleric acid and 6-aminohexanoic acid, also called 6-aminocaproic acid, alone or in mixture.

In a particular embodiment, the amino acid is formed in situ, by hydrolysis, from an amino acid precursor. The term "amino acid precursor" is understood to mean a molecule which does not have both an amine function and an acid function, which may be converted into amino acid in the presence of water under the conditions of the hydrothermal treatment according to the invention. In other words, in this particular embodiment, no amino acid is introduced into the reaction medium. Only a compound which forms an amino acid when hydrolyzed is introduced.

A preferred family of amino acid precursors is the lactam family. Thus, advantageously, the amino acid precursor is chosen from the group consisting of pyrrolidone and N-methylpyrrolidone (NMP).

In another particular embodiment, the method is carried out in the presence of an amino acid and of an amino acid precursor. Thus, in this embodiment, the method is carried out with two sources of amino acid. The amino acid resulting from the precursor may be the same amino acid as that introduced as such or it may be a different amino acid.

It should be noted that the use of an acid alone, an amine alone or a mixture of the two does not provide the same advantages as the use of an amino acid or a mixture of amino acids.

It should be noted that the functionalization with an amino acid of zirconia nanoparticles obtained by a process different from this invention does not provide the same advantages as the use of an amino acid or of a mixture of amino acids during the hydrothermal treatment. In other words, preparing zirconia particles in the absence of amino acid and then functionalizing these particles with an amino acid does not make it possible to obtain particles having the properties of the $ZrO_2$ nanoparticles according to the invention.

Hydrothermal Treatment Operating Conditions

In accordance with the invention, a zirconium IV compound undergoes a hydrothermal treatment to produce zirconium dioxide nanoparticles. This treatment may be carried out under an inert atmosphere (for example under argon or under nitrogen) or in air, advantageously in air.

Advantageously, the hydrothermal treatment is carried out at a temperature greater than or equal to 100° C., preferably greater than or equal to 150° C., more advantageously between 170 and 220° C., and even more advantageously between 180 and 200° C.

Those skilled in the art know how to choose the duration of the hydrothermal treatment, in particular as a function of the temperature and the pressure selected. Generally, a longer duration of the hydrothermal treatment may induce a reduction in the temperature of the process necessary to ensure the good formation of the nanoparticles in crystalline form. By way of example, the duration may be less than 48 hours, or even less than 24 hours. According to a preferred embodiment, it may be between 60 minutes and 180 minutes.

However, depending on the experimental conditions, the rise in temperature may be sufficient to ensure the hydrothermal treatment. This is in particular the case when the hydrothermal treatment is carried out at a temperature of at least 180° C., for example with a sufficiently slow rise advantageously of a few degrees per minute, more advantageously of around ten degrees per minute.

Thus, it is possible to implement the process according to the invention continuously or in batches ("batch" process).

Those skilled in the art will know how to adapt the experimental conditions, in particular the temperature and the duration of the hydrothermal treatment, but also the rise in temperature, according to the implementation methods of the method selected and the desired yield in terms of nanoparticle production.

Preferably, the hydrothermal treatment is carried out at a pressure greater than or equal to 0.1 MPa. Advantageously, the hydrothermal treatment is carried out at a pressure less than or equal to 2 MPa, more preferably between 0.1 and 2 MPa, even more preferably between 0.12 and 1.5 MPa, and even more preferably between 0.15 and 0.6 MPa. Thus, it may be carried out at a pressure between 0.1 MPa and 0.6 MPa.

Thus, the use of an amino acid makes it possible to work under advantageous conditions compared to the methods of the prior art, which makes it possible to use less expensive equipment. For example, an autoclave-sized may be used to achieve a maximum pressure of 0.6 MPa.

Generally, the pressure of the hydrothermal treatment results from the temperature and the compounds used for the reaction. Optionally, the pressure may be increased by means of an advantageously inert gas, for example nitrogen or argon.

This treatment is carried out at a pH below 7, more advantageously at a pH between 1 and 6, and even more advantageously at a pH between 3 and 5. However, in addition to the amino acid, the process is advantageously carried out without introducing Brönsted acid. Without wishing to be bound by any theory, it is possible that the reaction between zirconium IV compound and water acidifies the reaction medium by the formation of H+ ions. Advantageously, no Brönsted acid base is introduced before carrying out the hydrothermal treatment.

When the hydrothermal treatment is carried out in the presence of additional water, the amino acid concentration is advantageously between 1 and 13 mol·l$^{-1}$, more advantageously between 1.5 and 4 mol·l$^{-1}$. Still in the presence of additional water, zirconium IV concentration is advantageously between 0.1 and 8 mol·l$^{-1}$, more advantageously between 0.5 and 2 mol·l$^{-1}$.

As already indicated, the process according to the invention may be carried out with a zirconium IV compound used in hydrated form, in this case it is not necessary to add water. In other words, even if it is possible to provide water, the number of water molecules of the zirconium IV compound in hydrated form is sufficient for the hydrothermal treatment and to lead to zirconium dioxide nanoparticles. Thus, in a particular embodiment, the water is obtained only from a hydrated form of the zirconium IV compound. This embodiment is also applicable when an amino acid precursor is used.

Besides the fact that in this particular embodiment the quantity of water used may be greatly reduced, it is particularly advantageous because the Applicant has noticed that the pressure could be greatly reduced. In fact, in this particular embodiment, it is possible to carry out the hydrothermal treatment at a pressure greater than or equal to 0.1 MPa and less than or equal to 0.6 MPa, more advantageously less than or equal to 0.4 MPa.

Carrying out the hydrothermal treatment without adding water generally results in a viscous paste. Surprisingly, this viscous paste may be easily dispersed in water and a stable dispersion of zirconium dioxide nanoparticles may be obtained.

Advantageously, the amino acid is present in a molar ratio to the zirconium IV compound of at least 1, more advantageously between 1 and 50, even more advantageously between 2 and 50 and even more advantageously between 3 and 30.

In the case where the molar ratio of the amino acid relative to the zirconium compound is less than 1, the amount of amino acid added is not sufficient to interact with the entire surface of the nanoparticles synthesized. This deficiency gives rise to the formation of polydisperse agglomerates of anisotropic monoclinic $ZrO_2$ nanoparticles similar to those obtained by the hydrothermal treatment of a zirconium precursor in aqueous medium in the absence of a stabilizing agent.

Advantageously, the zirconium dioxide nanoparticles may be doped with different dopants, including transition metals, for example yttrium and/or lanthanides, for example gadolinium and/or cerium and more particularly the oxides of these metals, preferably $Y_2O_3$, $CeO_2$ or $Gd_2O_3$. To do this, the hydrothermal treatment may be carried out in the presence of one or more sources of dopant, preferably a source of yttrium and/or a source of cerium and/or a source of gadolinium. Preferably, the source of yttrium is $YCl_3$. Preferably, the source of cerium is $CeCl_3$.

Preferably, the source of gadolinium is $GdCl_3$.

In general, the dopant source may or may not be hydrated.

Generally, the source of doping element is introduced at a maximum of 20 mol %, advantageously at most 12 mol %, and advantageously greater than or equal to 0.1 mol %, more advantageously greater than or equal to 1% molar, relative to zirconium IV. Thus, the source of doping element may in particular be between 0.1 and 20 mol %.

In general, the source of the doping element is introduced into the reaction medium before the hydrothermal treatment.

Doping makes it possible to improve certain properties. For example in the case of yttrium, cerium and gadolinium, the doping makes it possible in particular to modify the size, the morphology and the crystalline phase of the particles. In general, the particles exhibit a smaller size, higher quadratic phase content, and a more spherical morphology with controlled doping of these elements. In addition, during the production of dense ceramic materials from these nanoparticles, the presence of doping elements makes it possible, depending on the doping rate, to also stabilize the quadratic phase at room temperature in a metastable state, making it possible to obtain solid ceramic materials without cracks and with remarkable mechanical properties of tenacity and resistance to breakage. The cubic phase may also be stabilized in a fraction or in all of the material by increasing the amount of dopant to obtain materials with high ionic conductivity or high transmittance. During the sintering heat treatment, the presence of doping elements makes it possible to limit the growth of the grains to obtain a finer microstructure, often associated with increased hardness and improved mechanical properties.

The method according to the invention may also comprise a step to purify the $ZrO_2$ nanoparticles. This step may be carried out by washing and/or rinsing, for example with water. In particular, this step makes it possible to eliminate the amino acid molecules which do not interact with the nanoparticles as a functionalizing and/or stabilizing agent.

The $ZrO_2$ nanoparticles may be isolated, for example by drying, so as to obtain a powder. They may then be dispersed in a fluid, for example water, an alcohol, in particular glycerol or propylene glycol.

$ZrO_2$ Nanoparticles

As already mentioned, the invention also relates to a dispersion in water ranging up to 80% by weight of zirconium dioxide nanoparticles stabilized with an amino acid and exhibiting a transmittance, for a dispersion at 40% by weight, advantageously ranging from 20% up to 83% at 400 nm wavelength and advantageously ranging from 95% up to 99.9% at 800 nm wavelength. It also relates to nanoparticles in powder form, advantageously stabilized with an amino acid. The amino acid is advantageously obtained from the hydrothermal treatment.

By transmittance, we denote the total transmittance, that is to say the sum of the direct transmittances (corresponding to "in line transmittance") and indirect transmittances (corresponding to "diffuse transmittance").

The total transmittance of the dispersion is generally measured in water at 20° C., for example with a double beam spectrophotometer, such as for example the V-670 model from JASCO, at room temperature. A quartz cuvette having an optical path length of 10 mm is used. The $ZrO_2$ nanoparticles are dispersed in water at the desired concentration. The transmittance value measured on the dispersion, described as a percentage with respect to the transmittance measured on the cell filled with deionized water, is an increasing function of the incident wavelength in the range 200 nm-1000 nm, including the visible domain (380-780 nm). For example, the value measured at 600 nm will be greater than the value measured at 400 nm and less than the value measured at 800 nm. The total transmittance value at a fixed wavelength generally increases as the concentration of nanoparticles decreases. On the other hand, the total transmittance is not proportional to the concentration of $ZrO_2$ nanoparticles and there is no correlation between the transmittances at different wavelengths. In other words, it is not possible to predict transmittance at a given concentration or at a given wavelength from a single measurement at a different concentration or at a different wavelength.

The rate of organic matter (TMO) present in an aqueous dispersion is calculated as a percentage relative to the mass of nanoparticles. This measurement is carried out on the nanoparticles after drying at 120° C. using a desiccator of the Kern DBS type. The dry particles are introduced into a crucible, then the loss of mass as a function of temperature is recorded by thermogravimetric analysis (TGA) using a thermal analyzer, for example of the TGA4000 type from Perkin Elmer, between 30 and 900° C. at a speed of 10° C./min. The percentage of organic matter corresponds to the ratio between the loss of mass between 160 and 600° C. and the initial mass of the dry particles.

This rate varies according to the embodiment used. Advantageously, the level of organic matter is less than or equal to 15% by weight, more advantageously less than or equal to 8% by weight, even more advantageously less than or equal to 5% by weight, and even more advantageously less than or equal to 3.5% by weight.

The refractive index of the dispersion is generally measured in water at 20° C. at a wavelength of 589 nm, using a refractometer, such as for example the Abbemat 200 model from Anton Paar. The $ZrO_2$ particles are dispersed in water at the desired concentration. The refractive index value measured on the dispersion generally increases as the particle concentration increases.

In general, the dispersion according to the invention has a high refractive index, advantageously greater than or equal to 1.40 and less than or equal to 1.90 for a concentration of 40% by weight and greater than or equal to 1.50 and less than or equal to 2.00 for a concentration of 65% by weight.

Zirconia (zirconium dioxide) has one of the highest refractive indexes in the family of metal oxides. The value of the refractive index varies slightly depending on the crystal structure (monoclinic, quadratic and cubic). In addition, in solid ceramic materials that are well crystallized, it is between 2.16 and 2.24. This property of the material makes it possible to consider its use to increase the refractive index of a medium, for example, a solvent or a resin. If the nanoparticles are well dispersed in the medium and have a sufficiently small primary size to avoid light scattering phenomena, the resulting composite nanomaterial may exhibit a high refractive index as well as good transmittance.

The closer the refractive index of nanoparticles approaches the theoretical refractive index of ceramic materials (2.16 to 2.24), the more effective the nanoparticles are in increasing the refractive index of the composite, allowing "obtain a higher index for the same charge rate. In general, well-crystallized nanoparticles have a higher refractive index.

The refractive index of a nanocomposite material exhibiting well dispersed charges and of approximately spherical morphology may be calculated from the refractive index of each of the components. Conversely, the refractive index of nanoparticles may be calculated from index measurements carried out on the nanocomposite at different concentrations with a model representative of the system. Different equations obtained from different mathematical models may be used for this calculation. The models commonly used in these systems include the linear approximation as well as the models of: Lorenz-Lorentz, Maxwell-Garnett and Bruggman (J. Humlicek, "Data Analysis for Nanomaterials: Effective Medium Approximation, Its Limits and Implementations," in Ellipsometry at the Nanoscale, 2013, pages 145-178).

The model that underestimates the refractive index of nanoparticles the most, is that of the linear approximation, which is described by the following equation:

$$RI_{nc}=f_m*RI_m+f_{NP}*RI_{NP}$$

In this equation, $RI_{nc}$ is the refractive index of the nanocomposite, $f_m$ the volume fraction of the medium, $RI_m$ the refractive index of the medium, $f_{NP}$ the volume fraction of the nanoparticles and $RI_{NP}$ the refractive index of the nanoparticles.

Advantageously, the zirconia nanoparticles according to the invention have a refractive index of between 2.0 and 2.2, more advantageously between 2.10 and 2.15. The refractive index of nanoparticles does not correspond to that measured in water for dispersions of nanoparticles. As indicated in the part relating to the examples according to the invention, it is determined from the measurements carried out on the dispersions of nanoparticles.

The viscosity of the dispersion is generally measured in water at 20° C., using a rheometer, for example, the Kinexus Pro+model from Malvern Instruments. The $ZrO_2$ nanoparticles are dispersed in water at the desired concentration. The viscosity is measured at different shear rates between 0.1 $s^{-1}$ and 100 $s^{-1}$ to verify that it is a Newtonian fluid with a constant viscosity as a function of the shear rate. The value measured at 1 $s^{-1}$ is reported as the value of the viscosity of the dispersion. Viscosity, at a fixed shear rate, generally increases with increasing concentration.

In general, the nanoparticles according to this invention, in water and at a concentration of 40% by weight, a viscosity of between 1 and 10 mPa·s, advantageously between 2 and 8 mPa·s and in a manner even more advantageous between 2 and 6 mPa·s.

The nanoparticles obtained by the method according to the invention have an average primary size, measured by image analysis from TEM (transmission electron microscopy) images of the nanoparticles deposited on a support transparent to the electron beam. The average primary size is understood to mean the average over at least 300 nanoparticles of the maximum length between two points on the surface of a nanoparticle. Thus, when the nanoparticle is perfectly spherical, the average primary size corresponds to the average diameter, whereas when the nanoparticle is not spherical, the average primary size corresponds to the average height of the minimum cylinder in which the nanoparticle is inscribed. In this way, the average primary size of the nanoparticles obtained by TEM is advantageously between 2 nm and 60 nm, more advantageously between 3 nm and 40 nm, even more advantageously between 4 nm and 20 nm, and even more advantageously between 5 nm and 7 nm. A second indirect method for estimating the primary particle size is the Scherrer method. This method makes it possible to calculate the primary size from the measurement of the width of the main diffraction peaks at half height (full width at half maximum—FWHM) after having subtracted from the diffraction spectrum the component Ka2 and having corrected the measurement FWHM taking into account the peak broadening due to the device (instrumental peak broadening). The peaks selected for the measurement are (−111) and (111) for the monoclinic phase and (111) for the quadratic/cubic phase. The crystallite size is then calculated with the Scherrer equation with a form factor of 0.89.

The DLS (the acronym denoting "Dynamic Light Scattering") technique makes it possible, by spectroscopic analysis, to measure the hydrodynamic size of particles present in a liquid medium, for example an aqueous medium such as water. In general, the hydrodynamic size is different from the primary particle size measured by TEM or by DRX (Scherrer's method). This technique is also sensitive to the presence of particle agglomerates. Where appropriate, the value measured by DLS is greater than the size of the particle in the absence of agglomerates. In addition, the results of this analysis makes it possible to give the mean hydrodynamic size in volume $D_V$, in intensity $D_I$, in number $D_N$ as well as the associated $D_{50}$ and $D_{90}$. The $D_{50}$ value corresponds to the hydrodynamic diameter for which 50% of the particles measured have a diameter less than or equal to $D_{50}$. The $D_{90}$ value corresponds to the hydrodynamic diameter for which 90% of the particles measured have a diameter less than or equal to $D_{90}$. These latter values may be calculated in volume ($D_{V50}/D_{V90}$), number ($D_{N50}/D_{N90}$) or intensity ($D_{I50}/D_{I90}$).

The number-average hydrodynamic size ($D_N$) is advantageously between 3 nm and 50 nm, more advantageously between 4 nm and 30 nm. They advantageously have a $D_{N50}$ size between 3 nm and 50 nm and more advantageously between 4 nm and 35 nm. They advantageously have a $D_{N90}$ size between 5 nm and 50 nm and more advantageously between 6 nm and 40 nm.

The volume average hydrodynamic size ($D_V$), measured by DLS, is advantageously between 3 nm and 50 nm, more advantageously between 4 nm and 30 nm. The nanoparticles advantageously have a $D_{V50}$ size between 3 nm and 50 nm and more advantageously between 4 nm and 30 nm. They advantageously have a $D_{V90}$ size between 5 nm and 70 nm and more advantageously between 6 nm and 40 nm.

The index of dispersion (ID) corresponds to the ratio between the hydrodynamic size of the particle in volume measured by DLS and the primary size of the particle measured by TEM.

In general, the dispersion according to the invention has, in water, a very low index of dispersion, advantageously between 1 and 7, more advantageously between 1 and 4, even more advantageously between 1 and 2, even more advantageously between 1 and 1.5.

According to the experimental conditions, the nanoparticles obtained by the process according to the invention may be in crystalline, quadratic/cubic or monoclinic form or a mixture of both.

In a particular embodiment, the dispersion, or the paste, may be dried. In this case, a powder is obtained. Thus, the invention also relates to a powder obtained by drying the dispersion, or the paste, described above.

Obtaining a powder form provides a certain advantage because a powder may be stored and transported in a smaller volume than a dispersion. Furthermore, the powder obtained by drying the dispersion according to the invention may be easily dispersed not only in water but also in an organic solvent such as acetone, alcohols such as ethanol, isopropanol, glycerol or propylene glycol. It may also be dispersed in a resin, in particular to manufacture composites. In general, a good dispersion in the organic solvents at different polarities is obtained during the substitution of the amino acid by another organic molecule according to the general knowledge of a person skilled in the art.

Similarly, the powder may be dispersed at any pH, advantageously between 3 and 12. It may be produced from nanoparticles in which the amino acid has been substituted by an organic molecule.

Indeed, in a particular embodiment, the amino acid molecules are displaced after the formation of the zirconium dioxide nanoparticles.

As already mentioned, a dispersion, or a powder, of zirconium dioxide nanoparticles may be mixed with a resin to form a composite material.

Use of $ZrO_2$ Nanoparticles

Zirconia is one of the materials most used by the dentistry sector for the formulation of dental composites. These are photopolymerizable materials (near UV light, wavelength of 400 nm+/−20 nm) consisting of an organic phase and an inorganic phase. The organic phase is essentially composed of a di-methacrylate monomer, a polymerization agent and a photoinitiator. The inorganic phase consists of mineral fillers aimed at providing or strengthening certain properties such as, for example, improving the mechanical properties of the composite, reducing polymerization shrinkage, providing radiopacity to the dental composite. The dispersion of zirconia nanoparticles according to the invention is of particular interest in the dental field thanks to its high transmittance thus promoting deep photopolymerization of the dental composite and improved aesthetic properties.

Thus, composite materials particularly suitable for the dental field can be obtained from the dispersion described above.

$ZrO_2$ nanoparticles may also be used for their high refractive index (fields of surface coatings, composite materials, adhesives), their biocompatibility (fields of dental and orthopedic prostheses), their dielectric permittivity (field of electronics), their aesthetic quality (jewelry and watchmaking field). They are also used for shaping and densifying a dense ceramic material or coating, which may exhibit mechanical properties, such as abrasion, flexural or compression resistance and tenacity, and improved aesthetic properties, such as visible transmittance (areas of technical ceramics, biomedical ceramics and 3D printing materials).

The invention and the advantages which result therefrom will emerge more clearly from the following figures and examples given in order to illustrate the invention and not in a limiting manner.

FIG. 1 is a TEM image of the zirconium dioxide nanoparticles from Example 16.

FIG. 2 is a photograph of various samples of dispersions according to the invention.

EXAMPLES OF EMBODIMENT OF THE INVENTION

Examples 1 to 23 (Invention)

Unless otherwise indicated, the percentages of the constituents of a dispersion are expressed by weight.

The doping is for its part expressed as a molar percentage relative to the molar quantity of zirconium. This is generally the content of yttrium oxide ($Y_2O_3$), cerium oxide ($CeO_2$) or gadolinium oxide ($Gd_2O_3$). Thus, 3 mol % of yttrium corresponds to a doping of 3 mol % of $Y_2O_3$.

In an autoclave, the zirconium IV compound, the amino acid, its precursor or a mixture of several amino acids and, if necessary, water are introduced and/or a doping agent. The autoclave is then sealed, and the desired temperature and pressure is applied.

The process conditions are listed in Table 1 below. The pH before hydrothermal treatment of Examples 1 to 23 is between 1 and 5.

TABLE 1

| Example | ZrIV (36 mmol) | Amino acid/precursor | Doping | Solvent | Temperature (° C.) | Pressure (bar) | Duration (hour) |
|---|---|---|---|---|---|---|---|
| 1 | ZrOCl$_2$ | pyrrolidone (119 mmol) | No | Water | 180-200 | 10-12 | 3 |
| 2 | ZrOCl$_2$ | Pyrrolidone (236 mmol) | Yttrium (3 mol %) | Water | 200 | 10-12 | 3 |
| 3 | ZrOCl$_2$ | Pyrrolidone (236 mmol) | Yttrium (6 mol %) | Water | 200 | 10-12 | 3 |
| 4 | ZrOCl$_2$ | Pyrrolidone (944 mmol) | No | — | 200 | <3 | 3 |
| 5 | ZrOCl$_2$ | Pyrrolidone (944 mmol) | Yttrium (3 mol) | — | 200 | <3 | 3 |
| 6 | ZrOCl$_2$ | NMP (747 mmol) | No | — | 200 | <3 | 3 |
| 7 | ZrOCl$_2$ | ACA4 (119 mmol) | No | Water | 200 | 12-15 | 3 |
| 8 | ZrOCl$_2$ | ACA4 (119 mmol) | Yttrium (3 mol %) | Water | 200 | 12-15 | 1 |
| 9 | ZrOCl$_2$ | ACA4 (119 mmol) | Yttrium (6 mol %) | Water | 200 | 12-15 | 3 |
| 10 | ZrOCl$_2$ | ACA4 (119 mmol) | No | — | 220 | <3 | 3 |
| 11 | ZrOCl$_2$ | ACA4 (119 mmol) | Yttrium (3 mol %) | — | 220 | <3 | 3 |
| 12 | ZrOCl$_2$ | ACA6(119 mmol) | No | Water | 200 | 12-15 | 3 |
| 13 | ZrOCl$_2$ | ACA6(119 mmol) | Yttrium (3 mol %) | Water | 200 | 12-15 | 3 |
| 14 | ZrOCl$_2$ | ACA6(119 mmol) | Yttrium (6 mol %) | Water | 200 | 12-15 | 3 |
| 15 | ZrOCl$_2$ | ACA6(119 mmol) | Yttrium (8 mol) | Water | 200 | 12-15 | 3 |
| 16 | ZrOCl$_2$ | ACA6(119 mmol) | Yttrium (10 mol) | Water | 200 | 12-15 | 3 |
| 17 | ZrOCl$_2$ | ACA6(119 mmol) | No | — | 220 | <3 | 3 |
| 18 | ZrOCl$_2$ | ACA6(119 mmol) | Yttrium (3 mol %) | — | 220 | <3 | 3 |
| 19 | ZrOCl$_2$ | Pyrrolidone + ACA6 (944 mmol + 119 mmol) | Yttrium (3 mol %) | — | 200 | <3 | 3 |
| 20 | ZrOCl$_2$ | NMP + ACA6 (944 mmol + 119 mmol) | Yttrium (3 mol %) | — | 200 | <3 | 3 |
| 21 | ZrOCl$_2$ | ACA4 + ACA6 (119 mmol + 119 mmol) | Yttrium (3 mol %) | — | 220 | <3 | 3 |
| 22 | ZrOCl$_2$ | ACA6 (119 mmol) | Gadolinium (2 mol %) | Water | 200 | 12-15 | 3 |
| 23 | ZrOCl$_2$ | ACA6 (119 mmol) | Cerium (15 mol) | Water | 200 | 12-15 | 3 |

ACA4 = 4-Aminobutyric acid
ACA6 = 6-Aminocaproic acid

Examples CE1 to CE6 (Comparative Examples)

According to the method indicated for Examples 1 to 23, comparative tests were carried out (Table 2) in the presence of the following compounds or mixtures:
Butanoic acid+butylamine (example CE1).
Amino acid having two amine functions and an acid function (example CE2).
Butanoic acid (example CE3).
Butylamine (example CE4).
Aminocaproic acid+NH$_4$OH added gradually, leading to a pH of 12 before the hydrothermal treatment (example CE5).
Addition of NaOH, formation of a precipitate purified with water (to a conductivity less than 250 μS/cm), addition of acetic acid, the final pH being less than 7 (example CE6, carried out according to EP 2,371,768).

TABLE 2

| Example | ZrIV (36 mmol) | Functionalizing Agent | Doping (mol %) | Solvent | Temperature (° C.) | Pressure (bar) | Duration (hour) |
|---|---|---|---|---|---|---|---|
| CE1 | ZrOCl$_2$ | Butanoic acid + butyl amine (119 mmol + 119 mmol) | Yttrium (3) | Water | 200 | 12-15 | 3 |
| CE2 | ZrOCl$_2$ | DL-lysine (119 mmol) | Yttrium (3) | Water | 200 | 12-15 | 3 |
| CE3 | ZrOCl$_2$ | Butanoic acid (119 mmol) | Yttrium (3) | Water | 200 | 12-15 | 3 |
| CE4 | ZrOCl$_2$ | 1.6-diaminohexane (119 mmol) | Yttrium (3) | Water | 200 | 12-15 | 3 |
| CE5 | ZrOCl$_2$ | ACA6 (119 mmol) + NH$_4$OH | Yttrium (3) | Water | 200 | 12-15 | 3 |

TABLE 2-continued

| Example | ZrIV (36 mmol) | Functionalizing Agent | Doping (mol %) | Solvent | Temperature (° C.) | Pressure (bar) | Duration (hour) |
|---|---|---|---|---|---|---|---|
| CE6 | ZrOCl$_2$ | Acetic Acid (0.108 mmol) + NaOH | Yttrium (3) | Water | 200 | 12-15 | 3 |

Once the hydrothermal treatment is complete, the temperature and pressure are lowered so that the autoclave may be opened in a safe manner. The reaction media are then optionally washed and/or diluted or concentrated in order to obtain dispersions in water, fluids, having a concentration of 40% or 65% by weight of zirconium dioxide nanoparticles.

Each of the dispersions obtained is then analyzed. The state of agglomeration of the dispersion is determined by DLS. The stability of the dispersion at different concentrations is determined visually by the appearance or not of a precipitate after waiting for 10 days, without disturbance, at 20° C. The index of dispersion (ID) is determined by the ratio between the hydrodynamic size of the particle in volume measured by DLS and the primary size of the particle measured by TEM, only in the examples showing a single crystal phase with a spherical morphology, which may correspond to the monoclinic phase (M) when the particle size is less than 10 nm or to the quadratic/cubic phase (Q). In the case where the dispersion has different crystalline phases, including a monoclinic phase (M) exhibiting anisotropic particles with a primary size greater than 10 nm, the ID is not calculated. The primary size measured by TEM, on particles of monoclinic phase and anisotropic shape of more than 10 nm, corresponds to the length of the major axis of the particle. The viscosity is determined with a Malvern Instrument, model Kinexus Pro+, using geometry cone/plan 40 mm in diameter and 4° tilt at 20° C. The refractive index of the dispersion is determined at 20° C., at 589 nm, with an Anton Paar apparatus, model Abbemat 200.

As such, a Bruker D8 Advance diffractometer with Cu K-alpha radiation was used for 2-theta angles between 10-75° and the characteristic peaks were identified and attributed to either quadratic/cubic (Q) phase or in the monoclinic phase (M) by comparison with the X-ray diffraction database of the International Center for Diffraction Data. The relative intensity of peak 111 of phase Q and the sum of the relative intensities of peaks −111 and 111 of phase M were used to determine the majority phase (Table 3).

TABLE 3

| Example | DLS volume D$_V$ (nm) D$_{V50}$ (nm) D$_{V90}$ (nm) | TEM Majority phase (nm) | Viscosity (mPa · s) 40 wt % 65 wt % | Refractive index 40 wt % 65 wt % | Dispersion Index |
|---|---|---|---|---|---|
| 1 | 22.8<br>20.4<br>35.9 | 26.8 ± 10<br>(M) +<br>(Q) | —<br>— | —<br>— | — |
| 2 | 25.8<br>22.8<br>41.0 | 8.6 ± 2<br>(Q) | —<br>— | —<br>— | 3.00 |
| 3 | 11.8<br>9.8<br>19.5 | 8.0 ± 2<br>(Q) | —<br>— | —<br>— | 1.48 |
| 4 | 9.9<br>9.1<br>15.0 | 4.0 ± 1<br>(M) | —<br>— | —<br>— | 2.48 |
| 5 | 5.2<br>4.7<br>7.9 | 4.0 ± 0.8<br>(M) | —<br>— | —<br>— | 1.30 |
| 6 | 7.3<br>6.4<br>11.5 | 3.0 ± 0.6<br>(M) | —<br>— | —<br>— | 2.43 |
| 7 | 31.6<br>29.2<br>47.2 | 41.5 ± 8<br>(M) + (Q) | —<br>— | —<br>— | — |
| 8 | 25.1<br>23.0<br>37.7 | 15.2 ± 4<br>(Q) + (M) | —<br>— | —<br>— | — |
| 9 | 29.1<br>27.0<br>42.4 | 20.2 ± 3<br>(Q) + (M) | —<br>— | —<br>— | — |
| 10 | 41.7<br>38.8<br>61.0 | 52.1 ± 11<br>(M) | —<br>— | —<br>— | — |
| 11 | 41.7<br>39.1<br>60.5 | 53.4 ± 12<br>(M) | —<br>— | —<br>— | — |
| 12 | 8.4<br>7.5<br>13.1 | 6.0 ± 1<br>(Q) + (M) | —<br>— | —<br>— | — |
| 13 | 6.0<br>5.4<br>9.2 | 5.0 ± 1<br>(Q) | 5.7<br>— | 1.4123<br>— | 1.2 |

TABLE 3-continued

| Example | DLS volume $D_V$ (nm) $D_{V50}$ (nm) $D_{V90}$ (nm) | TEM Majority phase (nm) | Viscosity (mPa·s) 40 wt % 65 wt % | Refractive index 40 wt % 65 wt % | Dispersion Index |
|---|---|---|---|---|---|
| 14 | 5.5<br>4.9<br>8.5 | 5 ± 1<br>(Q) | 4.8<br>3900.2 | 1.4104<br>1.5175 | 1.10 |
| 15 | 5.5<br>4.7<br>8.0 | 4.7 ± 1<br>(Q) | 5.0<br>3100.4 | 1.4086<br>1.5086 | 1.17 |
| 16 | 4.6<br>4.9<br>6.9 | 4.6 ± 1<br>(Q) | 4.9<br>2500.1 | 1.4019<br>1.5045 | 1.00 |
| 17 | 28.6<br>25.5<br>44.3 | 5.0 ± 1<br>(M) | —<br>— | —<br>— | 5.72 |
| 18 | 9.5<br>8.6<br>14.5 | 3.0 ± 0.7<br>(Q) | —<br>— | —<br>— | 3.17 |
| 19 | 6.3<br>5.5<br>9.6 | 2.0 ± 0.4<br>(Q) | —<br>— | —<br>— | 3.15 |
| 20 | 6.5<br>5.8<br>9.8 | 2.8 ± 0.6<br>(Q) | —<br>— | —<br>— | 2.32 |
| 21 | 16.0<br>14.6<br>23.8 | 3.3 ± 0.6<br>(Q) + (M) | —<br>— | —<br>— | — |
| 22 | 7.6<br>6.9<br>11.6 | 6.1 ± 1<br>(Q) | 2.9<br>— | 1.4091<br>— | 1.25 |
| 23 | 6.3<br>5.7<br>9.7 | 6.2 ± 1<br>(Q) | 3.1<br>— | —<br>— | 1.02 |

$D_V$ = hydrodynamic diameter in volume
T % = transmittance in percent
Q = quadratic/cubic phase particles
M = monoclinic phase particles According to the invention, a stable dispersion of $ZrO_2$ nanoparticles at each of the concentrations was obtained in all of Examples 1 to 23.

TABLE 4

| Example | DLS volume $D_V$ (nm) $D_{V50}$ (nm) $D_{V90}$ (nm) | TEM (nm) | Stability |
|---|---|---|---|
| CE1 | 105.3<br>99.6<br>152.2 | 3 ± 1 | Unstable[1] |
| CE2 | 111.4<br>104.4<br>165.3 | 5 ± 1 | Unstable[1] |
| CE3 | 85.4<br>77.5<br>137.0 | >50 | Unstable[1] |
| CE4 | 108.4<br>105.1<br>175.3 | 9 ± 2 | Unstable[1] |
| CE5 | 1465.1<br>1220.4<br>4730.7 | 8 ± 1 | Unstable[1] |
| CE6 | 7.8<br>7.1<br>11.8 | 5 ± 1 | Stable[2] |

[1] formation of a precipitate at all concentrations
[2] dispersion at a concentration less than or equal to 40% by weight; formation of a solid at a concentration greater than 40% by weight In the absence of amino acid, or when the amino acid does not correspond to that used in the invention, or when a mixture of acid and amine is used, or when in the presence of amino acid used in the invention, the pH is greater than 7, the dispersions obtained are not stable, in particular due to the presence of particle agglomerates.

Thus, among the counter-examples, only CE6 makes it possible to obtain a stable dispersion when the concentration is less than or equal to 40% by weight. On the other hand, beyond 40% by weight of nanoparticles, the dispersion becomes very viscous and begins to solidify and to dry. Thus, it is not possible to obtain a dispersion at a concentration greater than 40% by weight of nanoparticles in the case of the counterexample CE6.

The transmittances at a concentration of 40% by weight of a dispersion of nanoparticles according to Examples 6, 12 to 16, 19 and 22 and according to counterexample CE6 were measured. The transmittance, in the range 400 to 800 nm, was determined with a Jasco Model V-670 apparatus. These are listed in Table 5.

TABLE 5

| Example | T % at 400 nm 40 wt % | T % at 800 nm 40 wt % |
|---|---|---|
| 6 | 31.4 | 95.0 |
| 12 | 28.1 | 91.6 |
| 13 | 46.9 | 95.4 |
| 14 | 59.9 | 97.6 |
| 15 | 74.0 | 99.2 |
| 16 | 82.9 | 99.9 |
| 19 | 32.8 | 91.5 |
| 22 | 41.0 | 96.4 |
| CE6 | 17.5 | 85.5 |

Thus, at the maximum concentration making it possible to obtain a stable dispersion according to counterexample CE6, namely 40% by weight of nanoparticles, the dispersions according to the invention exhibit better total transmittance at 400 nm and at 800 nm.

On the other hand, excellent transmittances even at 65% by weight can be obtained. The transmittance of dispersions with the nanoparticles of Examples 14, 15 and 16 were measured according to the above method at different concentrations. The results are listed in Table 6 below.

TABLE 6

| Example | T % at 400 nm 10 wt % 30 wt % 40 wt % 65 wt % | T % at 600 nm 10 wt % 30 wt % 40 wt % 65 wt % | T % at 800 nm 10 wt % 30 wt % 40 wt % 65 wt % | TMO 160-600° C. (%) |
|---|---|---|---|---|
| 14 | 79.2 | 95.9 | 99.2 | 3.1 |
|  | 65.2 | 91.2 | 97.7 |  |
|  | 59.9 | 89.2 | 97.6 |  |
|  | 46.3 | 82.8 | 96.9 |  |
| 15 | 85.5 | 97.8 | 99.6 | 3.3 |
|  | 77.4 | 95.9 | 99.1 |  |
|  | 74.0 | 94.6 | 99.2 |  |
|  | 68.2 | 93.8 | 98.5 |  |
| 16 | 89.7 | 98.6 | 99.9 | 3.4 |
|  | 84.7 | 97.8 | 99.9 |  |
|  | 82.9 | 97.6 | 99.9 |  |
|  | 74.7 | 94.9 | 98.5 |  |

FIG. 2 visually illustrates the transmittance of dispersions according to the invention. Three samples 1, 2 and 3 of dispersions according to the invention are positioned in front of an image 4. Sample 1 is a dispersion comprising 50% by weight of nanoparticles from Example 16. Sample 2 is a dispersion comprising 65% by weight of nanoparticles from Example 16. Sample 3 is a dispersion comprising 40% by weight of nanoparticles from Example 9.

The dispersion of sample 3 has a lower transmittance than the dispersions of the two samples 1 and 2. The transmittance of sample 3 is still very satisfactory, since one can effortlessly distinguish image 4 positioned behind the samples, despite a slight coloration of sample 3.

The two samples 1 and 2 have, for their part, a very high transmittance which makes it possible to perceive the image 4 very clearly without modification of the color. The magnifying effect that may be seen in FIG. 2 is due to the containers and not the dispersions.

Examples 24 and 25

The particles from Examples 12 and 16 were redispersed in acetone using a precipitation and functionalization procedure with a molecule endowed with a phosphate function. Stable and transparent dispersions of particles in acetone were obtained.

Examples 26 and 27

The particles from Examples 12 and 16 dispersed in acetone, after replacement of the amino acid by a molecule endowed with a phosphate function, were redispersed in a monomer, such as 1,10-decanediol dimethacrylate (D3MA), using a procedure of incorporation and evaporation of the initial solvent. Stable and transparent dispersions of particles in D3MA were obtained.

Example 28

The particles resulting from Example 16 were redispersed in propylene glycol, without substitution of the amino acid, using a procedure of precipitation and redispersion in the final solvent. A stable and transparent dispersion of particles in propylene glycol was obtained.

The total transmittances at different concentrations of the dispersions of Examples 24 to 28 were measured. The total transmittance value is described as a percentage relative to the transmittance measured on the tank filled with the corresponding pure solvent. These are listed in Table 7.

TABLE 7

| Example | Example No. Initial Particles | Solvent | Transmittance 400 nm | Transmittance 800 nm |
|---|---|---|---|---|
| 24 | 12 | Acetone | 45.2 (10 wt %) | 94.6 (10 wt %) |
|  |  |  | 11.6 (40 wt %) | 83.5 (40 wt %) |
|  |  |  | 4.2 (72 wt %) | 68.3 (72 wt %) |
| 25 | 16 | Acetone | 78 (10 wt %) | 97.2 (10 wt %) |
|  |  |  | 53.9 (40 wt %) | 95.7 (40 wt %) |
|  |  |  | 12.8 (67 wt %) | 57.4 (67 wt %) |
| 26 | 12 | D3MA | 8.8 (10 wt %) | 73.9 (10 wt %) |
|  |  |  | 3.9 (40 wt %) | 63.9 (40 wt %) |
|  |  |  | 3.7 (50 wt %) | 68.2 (50 wt %) |
|  |  |  | 5.0 (60 wt %) | 74.5 (60 wt %) |
| 27 | 16 | D3MA | 33.8 (10 wt %) | 73.3 (10 wt %) |
|  |  |  | 27.9 (40 wt %) | 83.9 (40 wt %) |
|  |  |  | 27.4 (50 wt %) | 80.6 (50 wt %) |
|  |  |  | 4.8 (70 wt %) | 58.9 (70 wt %) |
|  |  |  | 3.2 (80 wt %) | 33.0 (80 wt %) |
| 28 | 16 | Propylene glycol | 70.8 (60 wt %) | 94.7 (60 wt %) |

It is thus possible to redisperse the zirconium nanoparticles obtained according to the invention in a solvent other than water and to retain excellent transmittance at high concentration, as well as low viscosity and high stability over time.

Example 29 (Invention)

Example 29 may be compared to Example 9, only two synthesis parameters are modified. The amounts of zirconium precursors, yttrium, aminobutyric acid and water are the same, 6-aminocaproic acid is added. The procedure for dissolving solids is different. The zirconium precursor is dissolved in water together with 4-aminobutyric acid. The yttrium precursor is dissolved in water in the presence of 6-aminocaproic acid. After complete dissolution, the two solutions are mixed.

36 mmol of zirconium oxychloride, 119 mmol of 4-aminobutyric acid (ACA4) and 36 ml of water are introduced into a beaker. In a second beaker, yttrium chloride (doped with 6 mol % $Y_2O_3$), 23.8 mmol of 6-aminocaproic acid (ACA6) and 36 mL of water are introduced. After complete dissolution, the 2 solutions are mixed and introduced into a 100 mL autoclave. The autoclave is then sealed and heated to 200° C. for 3 hours, the pressure is between 12 and 15 bar.

In Example 29, a stable dispersion of $ZrO_2$ nanoparticles was obtained.

Unlike Example 9, the diffractogram obtained by X-ray diffraction analysis reveals the unique presence of the quadratic/cubic phase. Image analysis from TEM images of the nanoparticles obtained in Example 29 only reveals the presence of spherical particles with an average primary size of 20 nm.

Example 30

Nanoparticles obtained according to Examples 12 and 15 were washed with water and concentrated to different concentrations. The level of amino acid present on the surface of the nanoparticles was measured by TGA (thermogravimetric analysis). The refractive index of the resulting dispersions was measured using a refractometer (Anton Paar, Abbemat 200) at a wavelength of 589 nm and a temperature of 20° C. The density of nanoparticles having an amino acid on the surface (or functionalized) was calculated by linear approximation. The refractive index of the functionalized nanoparticles was calculated by linear regression from the refractive index values of the dispersions measured as a function of the volume fraction of the functionalized nanoparticles according to the linear approximation model. Taking into account the level of functionalizer present at the surface, the refractive index of non-functionalized (or bare) nanoparticles was calculated. The results of these measurements and calculations are presented in Table 8:

TABLE 8

| Example No. Initial Particles | % Volume functionalized nanoparticles | Refractive index measured at 20° C. |
|---|---|---|
| 12 | 0.021 | 1.3471 |
|  | 0.046 | 1.3651 |
|  | 0.077 | 1.3864 |
|  | 0.114 | 1.4121 |
|  | 0.162 | 1.4470 |
|  | 0.225 | 1.4845 |
| 15 | 0.023 | 1.3472 |
|  | 0.050 | 1.3629 |
|  | 0.083 | 1.3824 |
|  | 0.123 | 1.4066 |
|  | 0.174 | 1.4382 |
|  | 0.241 | 1.4794 |

For the nanoparticles from Example 12, after washing, the level of amino acid present on the surface and measured by TGA is 4.3% by mass on the total mass of the nanoparticles after drying, the density of the non-functionalized nanoparticles is 6.14 g/cm3. The density of the functionalized nanoparticles is 5.16 g/cm$^3$. The density of the medium is 0.998 and its refractive index is 1.3330. The density of the functionalizer (ACA6) is 1.13 g/cm$^3$ and its index is 1.4870. The refractive index of the resulting unfunctionalized nanoparticles is 2.1434 and the associated coefficient of determination is 0.9990.

After washing the nanoparticles from Example 15, the level of amino acid present on the surface and measured by TGA is 4.3% by mass on the total mass of the nanoparticles after drying, the density of the non-functionalized nanoparticles is 6.00 g/cm$^3$. The density of the functionalized nanoparticles is 4.72 g/cm$^3$. The density of the medium is 0.998 and its refractive index is 1.3330. The density of the functionalizer (ACA6) is 1.13 g/cm$^3$ and its index is 1.4870. The refractive index of the resulting unfunctionalized nanoparticles is 2.1011 and the associated coefficient of determination is 0.9999.

It should be noted that the linear approximation model underestimates the refractive index of nanoparticles. Consequently, the non-functionalized nanoparticles have a refractive index greater than or equal to that calculated.

The invention claimed is:

1. A process for preparing nanoparticles of zirconium dioxide, $ZrO_2$, by hydrothermal treatment, said process comprising hydrothermally treating a zirconium IV compound in the presence of water, at a pH below 7, and at least one amino acid comprising at least 4 carbon atoms, said amino acid exhibiting an acid function to amine function ratio greater than or equal to 1.

2. The process according to claim 1, wherein the hydrothermal treatment is carried out at a temperature greater than or equal to 100° C., and at a pressure less than or equal to 2 MPa.

3. The process according to claim 1, wherein the zirconium IV compound is chosen from the group consisting of zirconium halides.

4. The process according to claim 1, wherein the amino acid is chosen from the group consisting of aminobutanoic acids, aminopentanoic acids and aminohexanoic acids.

5. The process according to claim 1, wherein the amino acid is formed in situ, by hydrolysis, from an amino acid precursor chosen from the group consisting of lactams.

6. The process according to claim 1, wherein the water in the hydrothermal treatment is obtained only from a hydrated form of the zirconium IV compound.

7. The process according to claim 1, wherein the hydrothermal treatment is carried out at a pressure of between 0.1 MPa and 0.6 MPa.

8. The process according to claim 1, wherein the amino acid is present in a molar ratio to the zirconium IV compound of between 1 and 50.

9. The process according to claim 1, wherein the hydrothermal treatment is carried out in the presence of one or more sources of dopant.

10. The process according to claim 2, wherein:
the zirconium IV compound is zirconium oxychloride; and
the amino acid is chosen from the group consisting of 4-aminobutyric acid, norvaline, 5-aminovaleric acid and 6-aminocaproic acid.

11. The process according to claim 1, wherein the amino acid is formed in situ, by hydrolysis, from an amino acid precursor chosen from the group consisting of pyrrolidone and N-methylpyrrolidone, and wherein the zirconium IV compound is zirconium oxychloride.

12. The process according to claim 1, wherein the amino acid is present in a molar ratio to the zirconium IV compound of between 3 and 30.

13. The process according to claim 9, wherein at least one of the one or more sources of dopant is chosen from the group consisting of a source of yttrium and/or a source of cerium and/or a source of gadolinium.

* * * * *